Jan. 28, 1947.  G. P. BOSOMWORTH ET AL  2,415,028
METHOD OF MAKING SHEET MATERIAL
Filed Feb. 9, 1944  3 Sheets-Sheet 1
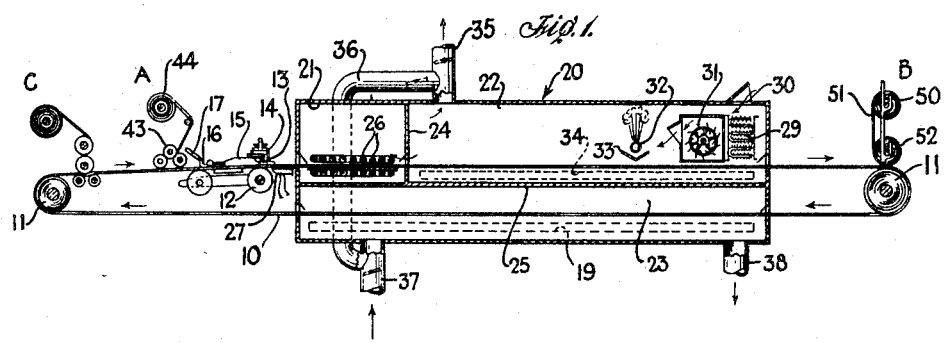
Fig. 1.
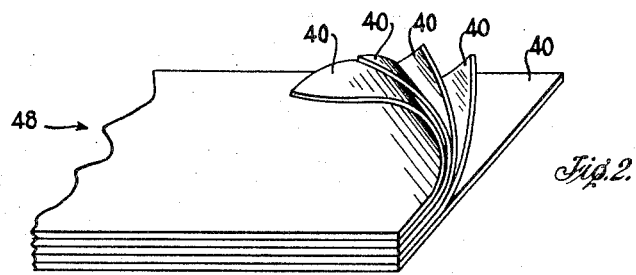
Fig. 2.
Fig. 3.
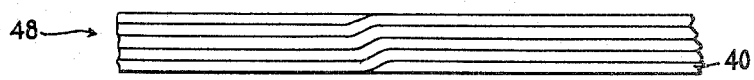
Fig. 4.
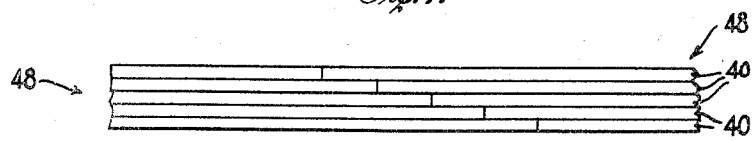
Inventor
GEORGE P. BOSOMWORTH
AND
CHARLES K. NOVOTNY
By Ely & Frye
Attorney Jan. 28, 1947.　　G. P. BOSOMWORTH ET AL　　2,415,028
METHOD OF MAKING SHEET MATERIAL
Filed Feb. 9, 1944　　3 Sheets-Sheet 2
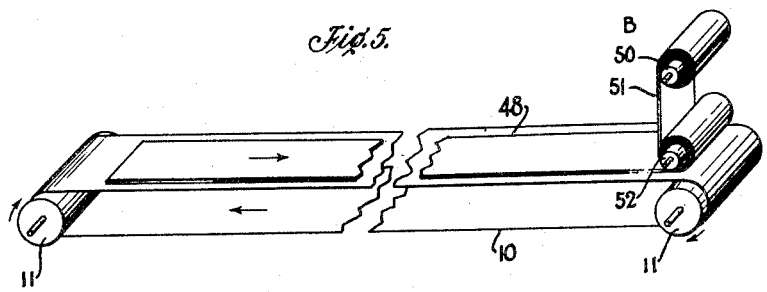
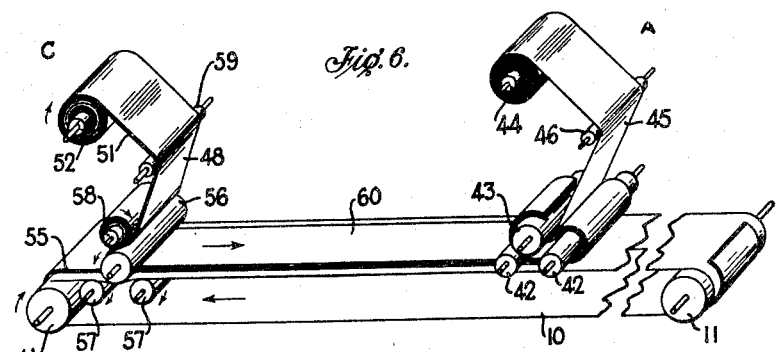
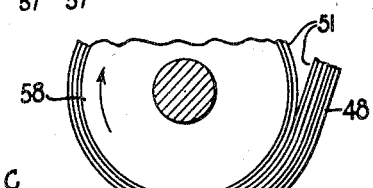
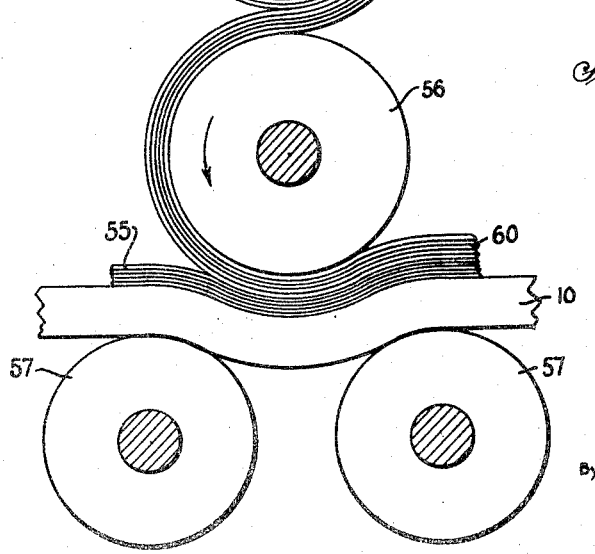
Inventor
GEORGE P. BOSOMWORTH
AND
CHARLES K. NOVOTNY
By
Attorneys Jan. 28, 1947.  G. P. BOSOMWORTH ET AL  2,415,028
METHOD OF MAKING SHEET MATERIAL
Filed Feb. 9, 1944  3 Sheets-Sheet 3

Inventor
GEORGE P. BOSOMWORTH
AND
CHARLES K. NOVOTNY

By
Ely & Frye
Attorneys

Patented Jan. 28, 1947

2,415,028

UNITED STATES PATENT OFFICE 2,415,028

METHOD OF MAKING SHEET MATERIAL

George P. Bosomworth, Akron, and Charles K. Novotny, Mansfield, Ohio, assignors to The Firestone Tire & Rubber Company, Akron, Ohio, a corporation of Ohio Application February 9, 1944, Serial No. 521,730

8 Claims. (Cl. 18—57)

This invention relates to methods of making sheet material, and more especially it relates to improved procedure for the manufacture of continuous or long length rubber sheets, either single ply or multi-ply, derived directly from aqueous dispersions of rubber such as latex.

In the manufacture of rubber sheeting of latex by methods that heretofore obtained, it was customary first to produce a sheet of film thickness (.002" to .004"), and subsequently to assemble a number of plies of such film to produce a sheet of the desired thickness. The film was initially formed on a backing structure, either by dipping or spreading, and in some cases was removed from the backing prior to the ply-up operation. In no case was it possible to produce single ply sheeting of substantial thickness, say .050".

Among the several products made from latex rubber may be mentioned hospital sheeting (about .015" thickness) and lining material for liquid fuel cells, such as self-sealing gasoline tanks, (about .125" thickness). The hospital sheeting should be non-porous, clear, and have a smooth soft "feel." The material for lining fuel tanks should possess the same characteristics, and in addition should be of accurate and uniform gauge.

The chief objects of the invention are to provide accuracy of gauge of the product of the invention; to obviate manual handling and manipulation of the respective plies of the laminated sheet material; to provide in a simple manner for obtaining adequate adhesion of the plies of the laminated sheeting; to provide sheeting that readily may be joined to other like sheeting by a stepped splice; and to provide rubber latex sheeting having a smooth, soft "feel." In short, the invention aims to conserve time and labor in the manufacture of latex sheet material of superior quality. Other objects will be manifest as the description proceeds.

Briefly stated, the improved method of making latex sheeting comprises progressively spreading a layer of prepared latex upon an endless backing structure such as a driven conveyor belt, and then subjecting the layer of material on the conveyor progressively to controlled conditions of temperature and humidity to effect the successive gelling, vulcanizing, and drying of the material. The material may be removed from the conveyor after one traverse of the apparatus, or it may remain on the conveyor while the latter makes several traverses of the apparatus, there being an additional layer spread upon the conveyor with each traverse, and gelled, vulcanized, and dried thereon, to produce a laminated structure. The invention also contemplates that a laminated sheet constructed in the manner set forth may be stripped from the conveyor and withheld while a second laminated sheet is constructed thereon. The first-constructed sheet is then progressively fed back onto the conveyor and cohesively united with the laminated sheet last constructed thereon, after which the composite sheet thus formed is progressively removed from the conveyor.

Of the accompanying drawings:

Fig. 1 is a somewhat diagrammatic view, on a greatly reduced scale, of one type of apparatus, adapted for the practice of the invention;

Fig. 2 is a perspective view, on an enlarged scale, of a fragmentary portion of a sheet of material constituting one of the products of the invention;

Fig. 3 is an edge elevation, on an enlarged scale, of a laminated sheet made according to the invention, showing the respective ends of the single sheet of which it is composed;

Fig. 4 is an edge elevation, on an enlarged scale, of a splice at the juncture of the ends or margins of two multi-ply sheets;

Fig. 5 is a diagrammatic detail showing the method of removing laminated sheet material at the right hand end of the apparatus;

Fig. 6 is a diagrammatic detail showing showing the feeding back of a sheet of laminated material onto the conveyor having a second sheet of laminated material thereon, and the subsequent removal of the two cohesively united laminated sheets as a unit;

Fig. 7 is a diagrammatic elevational detail, on a larger scale, showing how two laminated sheets are assembled.

Figure 8:
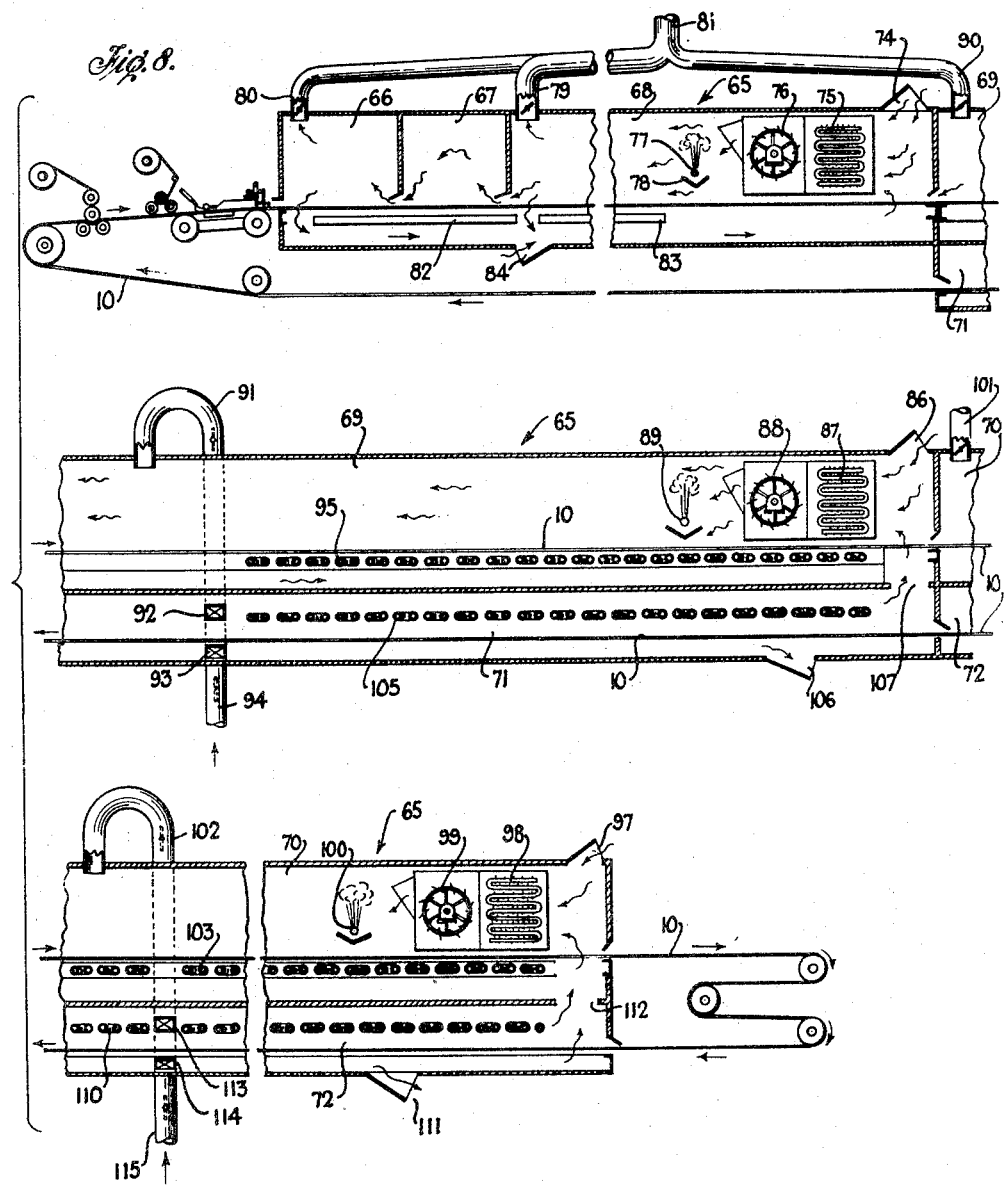
Fig. 8 shows another embodiment of the oven of the apparatus capable of numerous variations in the control of drying conditions, to compensate for variations in the thickness of the sheeting, the type of latex composition employed, and the type of sheeting desired.

Referring now to Fig. 1 of the drawings, there is shown sheet-forming apparatus comprising an endless conveyor belt 10 that may be composed of aluminum or other suitable material, waxed or otherwise treated, to which rubber latex does not strongly adhere, and which will not form blisters on the material deposited thereon. Said conveyor is mounted upon suitable rollers or pulleys 11, 11, at least one of which is driven so as to impel the conveyor in the direction indicated by the arrows. At one region of its upper reach the conveyor passes over a supporting roller 12, and positioned above the latter and the conveyor thereon is a doctor blade 13 that extends transversely of the conveyor and is mounted upon a holder 14, the latter being vertically adjustable, from and toward the conveyor, to vary the spacing of the doctor blade from the surface of the conveyor. The holder 14 also assists in supporting a pair of lateral guard plates, such as the plate 15, which plates are disposed adjacent opposite sides of the conveyor 10 and retain a bank of viscous rubber latex 16 thereon. The bank of latex is constantly supplied with fresh latex by a delivery nozzle 17 having connection with a suitable source of latex (not shown). The arrangement is such that a layer of latex of determinate thickness is spread upon the moving conveyor by the doctor blade 13, at the posterior side of the latter. The foregoing apparatus is shown and described in greater detail in the copending application for Letters Patent of George P. Bosomworth, one of the co-inventors hereof, said application filed concurrently herewith.

Beyond the doctor blade 13 both reaches of the conveyor 10 extend through an oven that is designated as a whole by the numeral 20, said oven being an elongate structure that encloses the major portion of the conveyor, and located in the medial region thereof, the opposite end portions of the conveyor being exposed. Interiorly the oven 20 is divided into three compartments consisting of a gelling compartment 21 and a vulcanizing compartment 22 through which the upper reach of the conveyor travels, and a drying compartment 23 through which the lower reach of the conveyor travels. Compartments 21, 22 are separated by a vertical partition 24, and both of said compartments are separated from the lower compartment 23 by a horizontal partition 25. Suitable slots are provided in the walls of the oven and in the partition 24 to enable the conveyor to pass therethrough. Mounted within gelling compartment 21 are heating coils 26, 26 that are located above and below the conveyor. To effect more rapid gelling of latex on the conveyor, electrical heating elements 27 are located immediately outside the gelling compartment and below the conveyor, but sufficiently remote from the doctor blade 13 so as not to effect gellation of the latex banked thereagainst. The heating elements 27 are utilized only when thick layers (.050" or more) of latex are on the conveyor.

Located in the vulcanizing compartment 22, at the end thereof remote from the gelling compartment 21, and above the conveyor 10, is a heating unit 29 that is positioned directly below an adjustable air-inlet port 30 in the top of the oven. Beside the heating unit 29 is a blower fan 31 adapted to draw fresh air into the oven, across the heating unit 29, and impel the heated air across a steam spray 32 and toward the opposite end of the compartment the air being moistened or humidified by said steam spray. Movement of the air is counter to the movement of the conveyor 10 whereby superior heat transfer to the material on the conveyor is achieved. A drain trough 33 is located below the steam spray to prevent condensate from the spray from falling onto the conveyor. Also heating the air within the compartment 22 is a steam-heated platen 34 located immediately below the conveyor 10. Humidified air is removed from the vulcanizing compartment through a duct 35 in the top of the oven, remote from the inlet port 30. Air passing through the duct 35 may discharge into the atmosphere, or it may be conducted therefrom through a duct 36 and discharged into the drying compartment 23, near the delivery end of the latter, through a duct 37, the latter also being adapted for the introduction of fresh air into said compartment. The drying compartment also has a vent or air-outlet duct 38 at the end thereof remote from the inlet duct 37, the arrangement being such that air in the compartment moves counter to the movement of the conveyor 10 and material thereon for improved heat transfer. A steam-heated platen 39 is located in the drying compartment beneath the conveyor 10 therein. The slots through which the conveyor 10 enters and leaves the drying compartment 21 are of such small size that the moving air in the vulcanizing compartment will not pass therethrough in sufficient quantity to gell the latex in the bank thereof against the doctor blade.

By regulating the temperature and humidity of the oven, and correlating the temperature and humidity with the speed of the conveyor, the composition of the material thereon, and the thickness of said material, it is possible to effect vulcanization and drying of the material to a determinate degree.

If the sheet material to be produced is thin, the conveyor may be run faster than when the material is thicker, or single-ply material is being made, and experience has shown that superior results are achieved when thicker sheet material is produced in laminated form. Latex sheeting on the conveyor may be removed therefrom at either end of the apparatus, as presently will be explained, depending upon the nature of the sheet material being produced. As shown in Fig. 1, sheet material may be removed from the conveyor 10 at the left hand end of the apparatus at a station designated A, and it may be removed from the conveyor at the right hand end of the apparatus at a station designated B. At the left hand end of the apparatus is a station C where laminated sheet material previously removed from the conveyor may be fed back thereonto, for a purpose hereinafter more fully explained.

In the practice of the invention with the apparatus described, the conveyor 10 is constantly driven, a bank or pool of rubber latex 16 is established and maintained on the left hand side of the doctor blade 13, as viewed in Fig. 1, and the elevation of the latter is adjusted so that a layer or ply 40 of the latex is spread upon the conveyor on the posterior or right hand side of the doctor blade. The layer 40 is carried by the conveyor 10 through the oven 20 where it is gelled and vulcanized in the compartments 21 and 22 thereof. Returning through the oven on the lower reach of the conveyor, the layer 40 is dried to the desired degree in the oven-compartment 23, after which it may be stripped from the conveyor at station A if desired. As is best shown in Fig. 6, station A comprises a pair of cradle rolls 42, 42 that extend transversely of the conveyor 10, above and closely adjacent the same, which cradle rolls support and peripherally drive a wind-up roll 43 positioned between the same. Suitably journaled above the conveyor 10 is a roll 44 of liner 45, and a guide-roller 46 for the latter. The sheet material removed at stapartly around the second cradle roll 42 which strips it from the conveyor, the sheet then being wound upon the wind-up roll 43 with liner 45 withdrawn from the roll 44 thereof. This completes a cycle of operation for the manufacture of vulcanized and dried, single ply, latex rubber sheeting. In stating that the sheeting is dried it will be understood that it is dry in a practical sense, although two or three percent residual moisture may remain therein.

In the manufacture of laminated latex sheeting, the vulcanized and dried sheet 40 is not removed from the conveyor at station A after one traverse of the oven as previously described, but remains on the conveyor. Then as the leading end of the sheet comes back to point of starting, at the doctor blade 13, the latter is quickly raised to the extent of an additional ply thickness, with the result that a layer of fluent latex is spread upon and added to the ply 40 thereon. The superposed layer is progressively gelled, vulcanized and dried as the conveyor traverses its course through the oven. The operations described are repeated until a laminated sheet or strip 48 of the desired number of plies has been deposited and dried upon the conveyor, after which the laminated sheet may be removed from the conveyor at station A in the manner previously described. In Fig. 2 is shown a laminated sheet 48 consisting of plies of sheet material 40 arranged in five superposed convolutions. Fig. 3 shows how the respective ends of the sheet 40 merge with the adjacent convolutions to produce a composite sheet of uniform thickness throughout. In the manufacture of laminated sheeting in the manner described, superior cohesion of the plies is obtained when the "dry" convolutions retain a modicum of moisture, for example, from five to eight percent moisture. The oven 20 or the speed of the conveyor 10 readily may be controlled to produce latex sheet with any desired degree of residual moisture.

In the freshly produced sheet 48, the plies 40 thereof cohere to each other with sufficient tenacity to enable the sheet to be handled as a unit, but the plies are not so tightly joined as to prevent their separation without difficulty. Thus it is possible to sever the ends of the respective plies 40 of a sheet 48 in stepped relation, and to join them to the complementally stepped ends of a contiguous sheet 48 to produce a stepped butt splice as shown in Fig. 4. Best results are obtained when the laminated sheets retain considerable residual moisture, for example, about 10 percent.

Due to a number of factors, it is impractical to construct laminated sheeting, by the method just described, to greater than a certain limited thickness. When laminated sheeting of greater thickness is desired, a somewhat different method is employed. Assuming that the practical limit of the apparatus is the vulcanizing and drying of a five-ply sheet, then for producing a ten-ply sheet the following procedure would be employed. First, a laminated sheet 48 is produced in exactly the same manner as previously described except that it is removed from the conveyor 10 at station B at the right hand end of the apparatus. As is best shown in Fig. 5, station B comprises a suitably journaled roll 50 of liner 51, and a wind-up roll 52 that rests upon the conveyor 10 and is peripherally driven thereby to strip the laminated sheet 48 from the conveyor and to wrap it about itself. The wind-up roll 52 also withdraws the liner 51 from the liner roll 50, so that said liner is interposed between the convolutions of the sheet 48 to prevent them from sticking to each other. It will be apparent that the removal of the laminated sheet 48 from the conveyor at station B prevents the top latex ply 40 thereof from being subjected to drying treatment in compartment 23 of oven 20, with the result that said ply is very moist when first rolled up. However, much of the moisture in said top ply soon is absorbed by the other plies 20 of the sheet, so that before subsequent use the entire sheet does not have more than 8 percent residual moisture. This is desirable since the moisture makes the sheet sufficiently tacky to cohere tightly to a second laminated sheet to be assembled therewith.

Thereafter a second laminated sheet is formed on the conveyor 10, which sheet is best shown in Figs. 6 and 7 and is designated 55. Sheet 55 is made by the same process as sheet 48 except that it is not removed from the conveyor at station B, with the result that its top ply is exposed to the drying effect of compartment 23 of the oven. While the laminated sheet 55 is being formed the roll of sheet material 48 and liner 51 is mounted at station C of the apparatus. As shown in Fig. 6, the apparatus at station C comprises a pressure roll 56 that rests upon the top of conveyor 10, and a pair of crade rolls 57, 57 disposed beneath the conveyor, transversely thereof in spaced relation and parallel to each other. The pressure roll 55 is disposed between the cradle rolls 56 and thus bows the conveyor slightly therebetween, the arrangement providing substantial area of contact between the pressure roll and the material carried by the conveyor, so as frictionally to rotate the pressure roll. Resting upon the latter and peripherally driven thereby is a liner re-wind roll 58. The station also includes a guide roller 59, and journal means for the roll 52 of sheet material 48 and liner 51.

As soon as the laminated sheet 55 is completely formed on the conveyor, the first produced laminated sheet 48 is fed back onto the conveyor in superposed relation to the sheet 55 thereon. In this operation, sheet 48 and liner 51 are withdrawn from roll 52 and pass over guide rolls 59. Thence they pass between rolls 58 and 56 where liner 51 is wound onto roll 58, sheet 48 passing around pressure roll 56 and being pressed by the latter progressively into superposed relation with the sheet 55 moving with the conveyor. Because of the tacky condition of sheet 48, due to moisture thereon, it coheres readily with sheet 55, the composite sheet, indicated at 60, Figs. 6 and 7, moving with the conveyor toward station A. Best results are obtained if the sheet 48 is applied to sheet 55 while somewhat warm, a temperature of 80°–100° F. being found satisfactory. At station A the laminated 10-ply sheet 60 is removed from the conveyor and wound in a liner in exactly the same manner as previously described with respect to a single ply of sheet material 40.

It will be obvious that the plying up operation at station C and the work-removing operation at station A may proceed concurrently, and that at the same time a layer of latex may be spread upon the conveyor at the doctor blade 13, the plying up and work-removing operations being completed in one complete traverse of the conveyor. The arrangement results in economy of time and labor and a superior product is produced.

As previously stated, the invention is adapted for the manufacture of a number of products composed of latex rubber in sheet form. Such products may employ different compositions including latex, or may consist solely of rubber latex, and vary widely in thickness, but the apparatus is sufficiently "flexible," that is, adjustable to various conditions, that all are readily and efficiently treated to effect the desired result. Thus it is possible to produce improved latex sheeting varying from the relatively thin material employed for hospital sheeting to the relatively thick laminated material employed in the manufacture of self-sealing liquid fuel cells. Best results have been obtained in the manufacture of hospital sheeting when a substantially non-heat-sensitized latex is employed such as the following:

|  | Parts |
|---|---|
| Latex (60%) | 166 |
| Water | 3.3 |
| Zinc oxide dispersion (50%) | 6.5 |
| Sulfur dispersion (50%) | 3.0 |
| Sodium diethyl dithiocarbamate solution (25%) | 4.0 |
| Sodium silicate solution (40%) | 3.3 |

Although this composition does not gell immediately upon entering the oven, the relative thinness of the sheet (about .015") and the surface tension of the composition combine to prevent appreciable spreading and thinning of the sheet at the lateral margins thereof. In the manufacture of rubber sheeting for fuel cells, which comprise a plurality of plies, straight 60% latex generally is used, without the addition of gelling or vulcanizing agents. In such case it is possible to spread a layer of latex as thick as .040" without appreciable thinning at the margins of the layer.

When spreading very thick layers (.050" or more) it is desirable that heat-sensitized latex be employed, and in some cases to utilize the electrical heating elements 27 of the apparatus. Heat-sensitive latex of the following composition has been found to give satisfactory results:

|  | Parts |
|---|---|
| Latex (60%) | 166 |
| Water | 12.5 |
| Zinc oxide dispersion (50%) | 6.5 |
| Sulfur dispersion (62.5%) | 4.0 |
| Sodium diethyl dithiocarbamate solution (25%) | 2.0 |
| Darvan No. 1 solution (50%)[1] | 5.0 |
| Calcium sulfate dispersion (66%) | 12.4 |

[1] Sodium salt of polymerized alkyl-aryl-sulfonic acids.

The invention also is adapted for the manufacture of sheeting of sponge or cellular rubber. In such case the latex is beaten or frothed, after which a gelling agent is added. Because the froth is less fluent than unfrothed latex, it may be spread on the conveyor to greater thickness. Thus it is possible to operate the apparatus with a blade setting of $\frac{1}{16}$ inch to produce sponge sheeting having an ultimate thickness of $\frac{3}{32}$ inch.

Referring now to Fig. 8 of the drawings, there is shown an oven that is somewhat more complex than that shown in Fig. 1, and which is more especially adapted for obtaining the various conditions of temperature and humidity that enable the apparatus to process latex compositions of various characteristics. The oven, which is designated as a whole by the numeral 65, comprises successive gelling compartments 66, 67 and successive vulcanizing compartments 68, 69, and 70 disposed in the upper portion thereof, and drying compartments 71, 72 in the lower portion thereof beneath vulcanizing compartments 69 and 70 respectively, said compartments being separated by suitable vertical and horizontal partitions. The end walls and vertical partitions are suitably slotted to enable the endless conveyor 10 to pass therethrough, the upper reach of the conveyor passing through the drying and vulcanizing compartments and the lower reach of the conveyor passing through the drying compartments.

At the end of vulcanizing compartment 68 remote from gelling compartment 67 is an adjustable fresh-air inlet duct 74, and adjacent the same above the conveyor is a steam-heated coil 75 and a blower fan 76 adapted to draw fresh air through the coil 75 and impel it longitudinally of the compartment, counter to the movement of the conveyor. In front of the blower 76 is a steam spray 77 adapted to moisten or humidify the heated air from said blower, there being a drain trough 78 below said spray extending transversely of the conveyor for removing water of condensation, thus preventing the latter from blemishing the sheet material on the conveyor. Moist air from compartment 68 enters gelling compartments 67 and 66 through the slots through which conveyor 10 passes. Moist air is vented from compartments 68 and 66 through branch ducts 79, 80 respectively that connect with a main ventilating duct 81, said air being withdrawn from the tops of said compartments. There is appreciable space between the conveyor 10 and the bottom of the oven, which space is continuous from compartment 66 through compartment 68, and in said space, below compartments 66, 67 and close to the conveyor is a steam heated platen 82. A similar platen 83 is positioned in said space below compartment 68, and extends about two-thirds the length of the latter. Fresh air may enter said space through an adjustable inlet port 84 in the bottom of the oven, and the cooler humid air may enter said space through openings between said platens and between platen 82 and the end-wall of the oven. The air is drawn through said space by the suction created at the end thereof by the fan 76, said air mixing with fresh air from the port 74 and passing through the heater therewith. The arrangement is such that but little of the heated air in compartment 66 escapes through the conveyor slot in the end wall of the oven, and there is no gelling of the latex in the bank or pool thereof at the doctor blade. The temperature in compartment 68 usually is maintained at 180°–220° F.

Vulcanizing compartment 69 is essentially similar to compartment 68. At the end thereof remote from the latter it has an adjustable inlet port 86 in its top, and has heating coils 87, blower fan 88, and steam spray 89 arranged adjacent thereto. At the end thereof adjacent compartment 68 is a vent duct 90 that is in communication with the main ventilating duct 81. Another vent duct 91 extends from the top of the compartment downwardly past the drying compartment 71 therebeneath, and has ports 92, 93 discharging into said drying compartment above and below the conveyor 10 therein. Duct 91 has an extension 94 through which fresh air from the atmosphere may be drawn or forced into said compartment 71. A battery of steam heated coils 95 are positioned in compartment 69 immediately below the upper reach of conveyor 10 therein. Hot, humid air circulates within compartment 69 in the same manner as in compartment 68, the temperature in the compartment usually being maintained at 210°–240° F.

Vulcanizing compartment 70 is substantially identical with compartment 69 in the arrangement of its inlet port 97, steam coil 98, blower fan 99, steam spray 100, vent ducts 101, 102, and steam coils 103. The use of the steam spray 100 is optional; for example, it will not be employed in the manufacture of laminated sheeting by the method that requires the sheeting to be removed from the conveyor 10 at station B at the right hand end of the apparatus, with the result that substantial drying of the uppermost ply of the sheeting will be effected in compartment 70. Usually this compartment is maintained at 220°–260° F.

Drying compartment 71, located below compartment 69, has a battery of heating coils 105 located therein below conveyor 10. This compartment has an adjustable outlet port 106 in the bottom wall of the oven, and also has an outlet port consisting of an opening 107 in the horizontal partition constituting the top of the compartment, said opening being disposed directly below inlet port 86 of compartment 69. The arrangement is such that air will be drawn longitudinally of compartment 71 by the suction of the fan 88, which is effective by reason of said opening 107. The temperature in compartment 71 is maintained at 220°–240° F.

Drying compartment 72 is substantially identical with compartment 71 in the arrangement of its battery of heating coils 110, adjustable outlet port 111, and opening 112 into compartment 70. The vent pipe 102 from compartment 70 may discharge into compartment 72 through respective ports 113, 114 located above and below the conveyor 10, said pipe 102 having an extension 115 through which fresh air may be introduced into the compartment. The temperature in compartment 72 is maintained at 220°–240° F.

From the foregoing description of the oven it will be apparent that substantially any temperatures and degrees of humidity may be provided in various parts of the oven to suit various vulcanizing and/or drying conditions. Furthermore, the conveyor 10 may be driven at any desired speed, say from 1 to 6 feet a minute, so that the sheet material may remain in the oven for the required duration to produce optimum results.

When the sheet material is made from heat-sensitized latex, the latter is substantially gelled on the conveyor by the time the latter has traversed the gelling compartments 66, 67, and is substantially vulcanized by the time the conveyor has traversed the vulcanizing compartments 68, 69 and 70. Preferably the drying conditions of the compartments 71, 72 are so adjusted that the sheet is substantially dry at the time it leaves the same, although some moisture (3% to 10%) may be allowed to remain in the sheet, especially when other layers of latex are to be superposed thereon, since better cohesion of the plies is thereby attained. When relatively thin sheets of material, such as hospital sheeting, are made, non heat-sensitized latex may be employed. In either case, controlled humidity in the vulcanizing sections assures that vulcanization and/or drying will progress from the interior toward the exterior of the sheet, and the formation of fine cracks in the surface of the sheet will be obviated. This is desirable in the vulcanization since it results in the sheeting having a soft-smooth "feel" which is desired.

By employing a plurality of vulcanizing compartments it is possible to expose the work to progressively increasing vulcanizing temperatures. Thus from the compartment 68 to compartment 70 the temperature may vary from 180° to 260° F. Preferably the drying compartments 71, 72 are not quite as hot as the vulcanizing compartments. Thus the temperature of the sheet material will gradually increase as it passes through the oven, and will have a temperature of about 212° F. at the time it leaves the same. Because there is no drying compartment beneath compartments 66 to 68, latex sheeting on the conveyor will have time to cool between the time it leaves the oven and the time it reaches station C of the apparatus, the temperature at the latter point desirably being 75°–95° F. The time required to effect vulcanization of the sheeting may vary from 30 minutes to 60 minutes depending upon the thickness of the sheet and the composition of the latex employed.

The feature of vulcanizing the material in an atmosphere moving counter to the movement of the material makes for improved heat transfer, and expedites the removal of moisture from the material.

From the foregoing it will be apparent that the invention makes it possible to produce continuous latex sheeting of substantial thickness, and which is clear and with a smooth, soft "feel." Furthermore, the laminated sheeting is without grain, and tears, with difficulty, along an irregular line.

Modification may be resorted to without departing from the spirit of the invention or the scope thereof as defined by the appended claims.

What is claimed is:

1. The method of making laminated sheet material which comprises spreading successive superposed layers of fluent latex composition upon a support, and vulcanizing each layer, without completely drying the same, before spreading a succeeding layer thereupon, to effect union of said layers.

2. The method of making laminated sheet material which comprises spreading successive layers of a vulcanizable aqueous dispersion of rubber in superposed relation upon a support, and vulcanizing each layer and subsequently removing a substantial but not total portion of the water content thereof before the application of a succeeding layer, to effect union of said layers.

3. The method of making laminated sheet material which comprises progressively spreading a vulcanizable aqueous dispersion of rubber longitudinally of an endless support until a plurality of layers of the dispersion are disposed in superposed relation thereon, and applying moist heat progressively to material on the support to effect vulcanization and thereafter applying dry heat to effect substantial but incomplete drying of each layer before the succeeding layer is applied thereover.

4. The method of making laminated sheet material which comprises progressively forming a layer composed of a vulcanizable aqueous dispersion of rubber and feeding said layer in an endless course to produce a multi-ply structure, and applying controlled moist heat at vulcanization temperature to the structure in one region of its course to effect substantial vulcanization of each ply of the structure before the succeeding ply is added thereto.

5. The method of making laminated sheet material which comprises spreading successive superposed layers of viscous vulcanizable composition upon a moving support while processing each layer to vulcanize the same before adding a succeeding layer thereto, stripping the laminated vulcanized material from the support, repeating the operation to produce a second sheet of laminated vulcanized material upon the support, progressively feeding the first-made sheet back onto the support in superposed relation to the laminated sheet thereon and bonding it thereto, and then removing the two laminated sheets as a unit from the support.

6. A method as defined in claim 5 including the step of drying each layer of composition after it is vulcanized, the last layer of the first laminated sheet being permitted to retain some moisture to provide adequate cohesion with the second laminated sheet when the latter is applied thereto.

7. The method for the continuous manufacture of non-porous rubber sheeting from a latex composition which comprises the steps of continuously spreading vulcanizable latex composition on a continuously moving surface to form a layer of uniform thickness upon said conveyor, then prior to drying, subjecting the unconfined continuously successive areas of said layer to a hot humid atmosphere to effect at least partial vulcanization thereof, and thereafter drying the vulcanized latex rubber.

8. The method for the continuous manufacture of non-porous rubber sheeting from a latex composition which comprises the steps of continuously spreading vulcanizable latex composition on a continuously moving surface to form a layer of uniform thickness upon said surface, then subjecting the unconfined continuously successive areas of said layer to successive zones of humid atmosphere of progressively increasing temperature to effect at least partial vulcanization thereof and thereafter drying said sheeting.

GEORGE P. BOSOMWORTH.
CHARLES K. NOVOTNY.